(12) United States Patent
Weiss et al.

(10) Patent No.: US 11,003,169 B2
(45) Date of Patent: May 11, 2021

(54) FIELD DEVICE OF MEASURING AND AUTOMATION TECHNOLOGY

(71) Applicant: Endress+Hauser Flowtec AG, Reinach (CH)

(72) Inventors: Steffen Weiss, Grenzach-Wyhlen (DE); Beat Tschudin, Reinach (CH); Bruno Worreth, Kiffis (FR); Thomas Bier, Riehen (CH); Christian Matt, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 192 days.

(21) Appl. No.: 16/091,196

(22) PCT Filed: Mar. 15, 2017

(86) PCT No.: PCT/EP2017/056066
§ 371 (c)(1),
(2) Date: Oct. 4, 2018

(87) PCT Pub. No.: WO2017/174308
PCT Pub. Date: Oct. 12, 2017

(65) Prior Publication Data
US 2019/0219988 A1   Jul. 18, 2019

(30) Foreign Application Priority Data
Apr. 5, 2016   (DE) .................. 10 2016 106 179.4

(51) Int. Cl.
G05B 19/4155   (2006.01)
G06F 3/01   (2006.01)
G01P 15/08   (2006.01)

(52) U.S. Cl.
CPC ...... *G05B 19/4155* (2013.01); *G01P 15/0802* (2013.01); *G06F 3/017* (2013.01);
(Continued)

(58) Field of Classification Search
CPC ...... G05B 19/4155; G05B 2219/25428; G05B 2219/31121; G05B 2219/31229; G06F 2200/1636; G06F 3/017; G01P 15/0802
See application file for complete search history.

(56) References Cited

U.S. PATENT DOCUMENTS

| | | | |
|---|---|---|---|
| 8,941,740 B2* | 1/2015 | Pham | G08B 21/02 |
| | | | 324/162 |
| 2003/0236579 A1* | 12/2003 | Hauhia | G05B 19/0428 |
| | | | 700/79 |

(Continued)

FOREIGN PATENT DOCUMENTS

| CN | 104035393 A | 9/2014 |
|---|---|---|
| CN | 105080821 A | 11/2015 |

(Continued)

OTHER PUBLICATIONS

Machine translation of DE 10 2011 084789 A1 (Year: 2011).*

(Continued)

*Primary Examiner* — Natalie Huls
(74) *Attorney, Agent, or Firm* — Kelly J. Smith; Endress+Hauser (USA) Holding Inc.

(57) ABSTRACT

The invention relates to a field device of measuring and automation technology. The field device has a radio module for providing access to an operating electronics of the field device. Such access enables the exchange of information between the operating electronics and a user. The radio module can be turned on by a first input signal sequence composed of accelerations of the field device housing and can be turned off by a second input signal sequence. A field device of the invention is shown schematically in FIG. 1.

11 Claims, 2 Drawing Sheets

(52) U.S. Cl.
CPC ............. *G05B 2219/25428* (2013.01); *G05B 2219/31121* (2013.01); *G05B 2219/31229* (2013.01); *G06F 2200/1636* (2013.01)

(56) References Cited

U.S. PATENT DOCUMENTS

| | | | | |
|---|---|---|---|---|
| 2004/0145613 A1* | 7/2004 | Stavely | ................ | G06F 1/1626 715/863 |
| 2006/0097983 A1* | 5/2006 | Haggman | ............. | G06F 1/1626 345/156 |
| 2009/0284463 A1* | 11/2009 | Morimoto | ............. | G06F 1/1656 345/156 |
| 2010/0256947 A1* | 10/2010 | Kim | ..................... | G06F 1/1626 702/141 |
| 2011/0271820 A1* | 11/2011 | Cockerell | ............. | G10H 1/348 84/746 |
| 2012/0033653 A1* | 2/2012 | Kalbag | ............... | H04W 72/085 370/338 |
| 2012/0140676 A1* | 6/2012 | Kim | ..................... | G06F 1/1694 370/254 |
| 2013/0325392 A1* | 12/2013 | Takahashi | ........ | H04M 1/72563 702/141 |
| 2014/0195015 A1* | 7/2014 | Faist | ..................... | G05B 15/02 700/83 |
| 2014/0308896 A1* | 10/2014 | Baret | ..................... | H04W 4/80 455/41.1 |
| 2015/0242349 A1* | 8/2015 | Robl | .................. | G05B 19/4185 710/301 |
| 2015/0286285 A1* | 10/2015 | Pantelopoulos | ......... | G09G 5/10 345/156 |
| 2015/0301615 A1* | 10/2015 | Kasar | ................... | G06F 3/0346 345/156 |
| 2016/0081030 A1* | 3/2016 | Tanabe | ............. | H04W 52/0254 455/574 |
| 2016/0085333 A1* | 3/2016 | Christopher | .......... | G06F 1/1633 345/177 |
| 2016/0110005 A1* | 4/2016 | Yin | ......................... | G06F 3/017 345/173 |
| 2016/0132046 A1* | 5/2016 | Beoughter | ........... | G06F 16/248 700/17 |
| 2016/0203344 A1* | 7/2016 | Fink | ........................ | G06F 21/86 726/26 |
| 2016/0246472 A1* | 8/2016 | Zhao | ...................... | G06F 1/1694 |
| 2016/0299478 A1* | 10/2016 | Junk | ....................... | H04W 4/80 |
| 2017/0131705 A1* | 5/2017 | Ishii | .................. | G05B 19/4184 |
| 2017/0176982 A1* | 6/2017 | Lutz | ................... | G05B 19/0423 |
| 2017/0257378 A1* | 9/2017 | Sprenger | ............ | H04L 63/0861 |
| 2018/0199761 A1* | 7/2018 | Gogorza Segurola | ...................... | A47J 43/0711 |
| 2018/0288039 A1* | 10/2018 | Haase | ................... | H04L 63/062 |
| 2018/0307191 A1* | 10/2018 | Allgaier | ............ | G05B 19/0423 |
| 2018/0350294 A1* | 12/2018 | Monse | .................. | G01D 13/00 |
| 2019/0213306 A1* | 7/2019 | Caselles | ................ | G06F 21/32 |
| 2019/0221961 A1* | 7/2019 | Zenuni | ................ | H01R 13/527 |
| 2019/0250019 A1* | 8/2019 | Allgaier | ................ | G01D 11/30 |

FOREIGN PATENT DOCUMENTS

| | | |
|---|---|---|
| DE | 102006062476 A1 | 2/2008 |
| DE | 102008003272 A1 | 7/2009 |
| DE | 102011084789 A1 | 4/2013 |
| DE | 102013106098 A1 | 12/2014 |
| DE | 102013107606 A1 | 1/2015 |
| DE | 102014104657 A1 | 10/2015 |
| EP | 2458831 A1 | 5/2012 |
| EP | 2999275 A1 | 3/2016 |

OTHER PUBLICATIONS

Machine translation of DE 10 2013 107606 A1 (Year: 2013).*
Examination Report for German Patent Application No. 10 2016 106 1794, German Patent Office, dated Dec. 23, 2016, 6 pp.

* cited by examiner

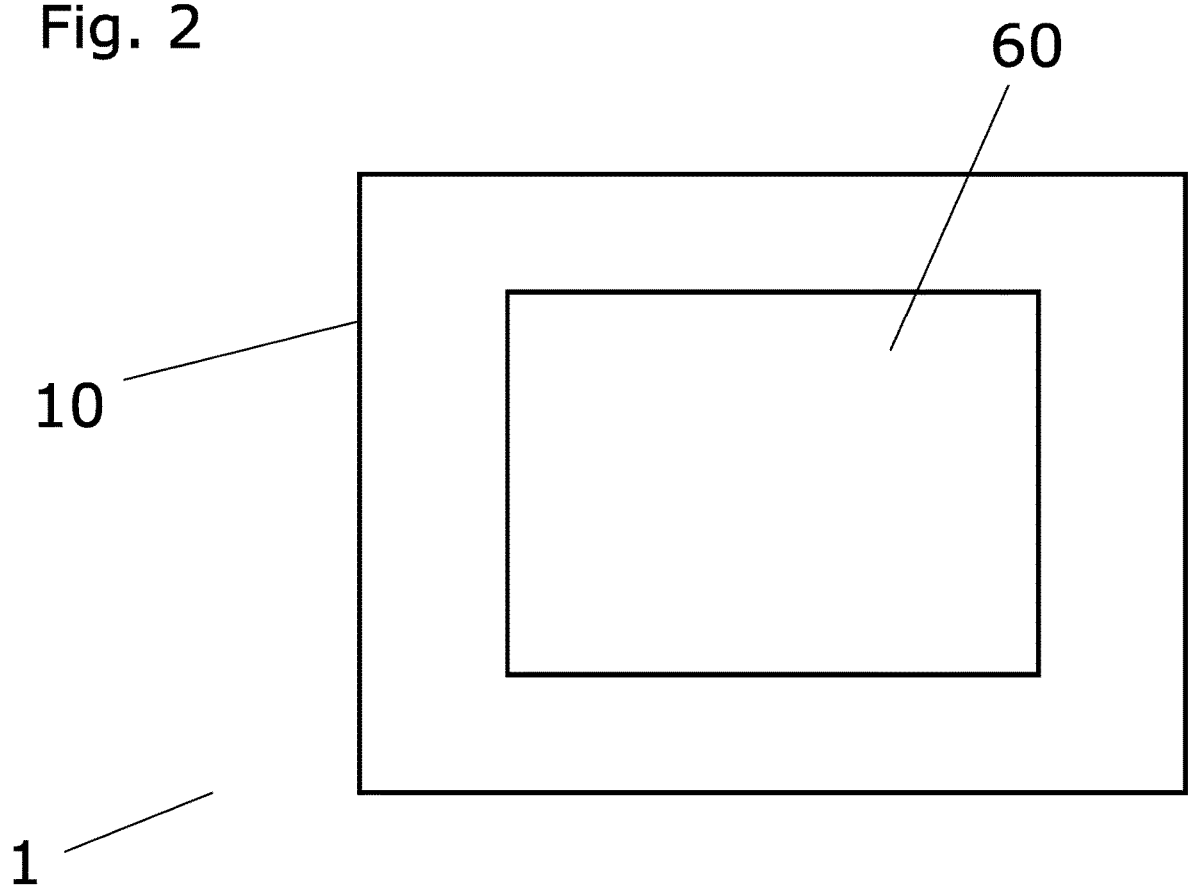

FIELD DEVICE OF MEASURING AND AUTOMATION TECHNOLOGY

CROSS-REFERENCE TO RELATED APPLICATIONS

The present application is related to and claims the priority benefit of German Patent Application No. 10 2016 106 179.4, filed on Apr. 5, 2016 and International Patent Application No. PCT/EP2017/056066 filed on Mar. 14, 2017, the entire contents of which are incorporated herein by reference.

TECHNICAL FIELD

The invention relates to a field device of measuring- and automation technology, which field device has a radio module.

BACKGROUND

Field devices are used for measuring- and automation technology, in order to register measured variables of various types. For example, field devices are used to measure volume flow of media in a pipeline or the fill level of a medium in a container.

Many such field devices have an interaction facility including keypad and display, in order to make settings in the field device or to retrieve current measured variables. Frequently, a complex interaction facility with keypad is, however, not desired, for example, because a keypad with a plurality of keys can be a source of errors. Thus, the application DE102013107606A1 discloses a photovoltaic plant component with a display and at least one acceleration sensor for time-resolved registering of acceleration profiles. Accelerations of the plant component, which can be produced, for example, by tapping, and which match an acceleration profile, are used for operating the plant component, wherein the acceleration sensor can register the site of the producing of the acceleration. This can be utilized to control the plant component by tapping on different regions of a display.

SUMMARY

Depending on field of use, there can be no interest in a comprehensive control of the field device by a direct mechanical interaction with the field device, since the field device has a radio interface for remote control. Such a radio interface is, however, only required in the case of a real interest in such control. In the case of non-use of the interface, it represents a safety hazard as regards undesired actuation. In addition, a field device with a radio interface means an increased energy requirement. An object of the invention is, therefore, to provide a field device, which has increased safety as regards undesired operation and a lower energy requirement. The object of the invention is achieved by a field device as defined in independent claim 1.

The field device of the invention for measuring- and automation technology includes, in such case, elements as follows:

A housing with a housing body, which housing body has at least one housing chamber with at least one housing wall, wherein the at least one housing wall surrounds the housing chamber;

a measuring transducer for registering at least one measured variable;

an operating electronics for operating the measuring transducer and for providing a signal dependent on the measured variable, wherein the operating electronics is arranged in the housing chamber, and wherein the operating electronics is electronically coupled with the measuring transducer;

a radio module, which serves for transmitting information and which is electronically coupled with the operating electronics, wherein the radio module is arranged in the housing chamber;

wherein the field device further includes at least one acceleration sensor, which is arranged in the housing chamber and by which an acceleration of the housing body is registrable, and wherein the operating electronics is coupled electronically with the acceleration sensor and is adapted to interpret at least one sequence of accelerations as an input signal sequence for control of the operating electronics, and wherein the radio module can be turned on by a first input signal sequence and can be turned off by a second input signal sequence.

In an advantageous embodiment of the field device, the radio module is a Bluetooth radio module.

In an advantageous embodiment of the field device, the field device further includes a display unit, wherein the display unit is inset in the housing wall, is coupled electronically with the operating electronics and displays a first set of parameters in a first mode, wherein the display unit can be triggered to display at least a second set of parameters by a third input signal sequence.

In an advantageous embodiment of the field device, the display unit includes a display or an LED element.

In an advantageous embodiment of the field device, the operating electronics is adapted to analyze at least one acceleration value measured by the acceleration sensor and to register an exceeding of an acceleration limit value as an input signal.

In an advantageous embodiment of the field device, the acceleration sensor is adapted to register an exceeding of at least one acceleration limit value as an input signal, wherein an input signal and/or input signal sequence registered by the acceleration sensor is registrable by the operating electronics.

In an advantageous embodiment of the field device, the acceleration sensor and/or the operating electronics are/is adapted to take into consideration acceleration values of one, two, or three spatial axes of an input signal and/or input signal sequence.

In an advantageous embodiment of the field device, the acceleration sensor and/or the operating electronics are/is adapted to take into consideration oscillation frequencies ascertained for analysis of the acceleration values.

In an advantageous embodiment of the field device, detecting of the input signal sequence is based on analysis of time intervals and/or amplitudes and/or number of input signals of the input signal sequence.

In an advantageous embodiment of the field device, the first input signal sequence and the second input signal sequence are equal.

In an advantageous embodiment of the field device, two input signal sequences are separated by a time interval of at least 3 seconds and especially at least 5 seconds.

In an advantageous embodiment of the field device, the measuring transducer is arranged in the housing chamber.

In an advantageous embodiment of the field device, the measured variable is at least one variable from the following list:

volume flow, mass flow, density, viscosity, temperature, pressure, fill level, pH-value, electrical conductivity, electrical current, electrical voltage, capacitance, inductance, transmission and/or absorption of electromagnetic radiation, transmission and/or absorption of sound signals.

The present invention thus provides a field device with a radio module, which can be turned on and off by touching or tapping

BRIEF DESCRIPTION OF THE DRAWING

The invention will now be explained in greater detail based on a form of embodiment illustrated schematically in the drawing, the figures of which show as follows:

FIG. 2 shows a side view of the housing.

DETAILED DESCRIPTION

Figure 1:
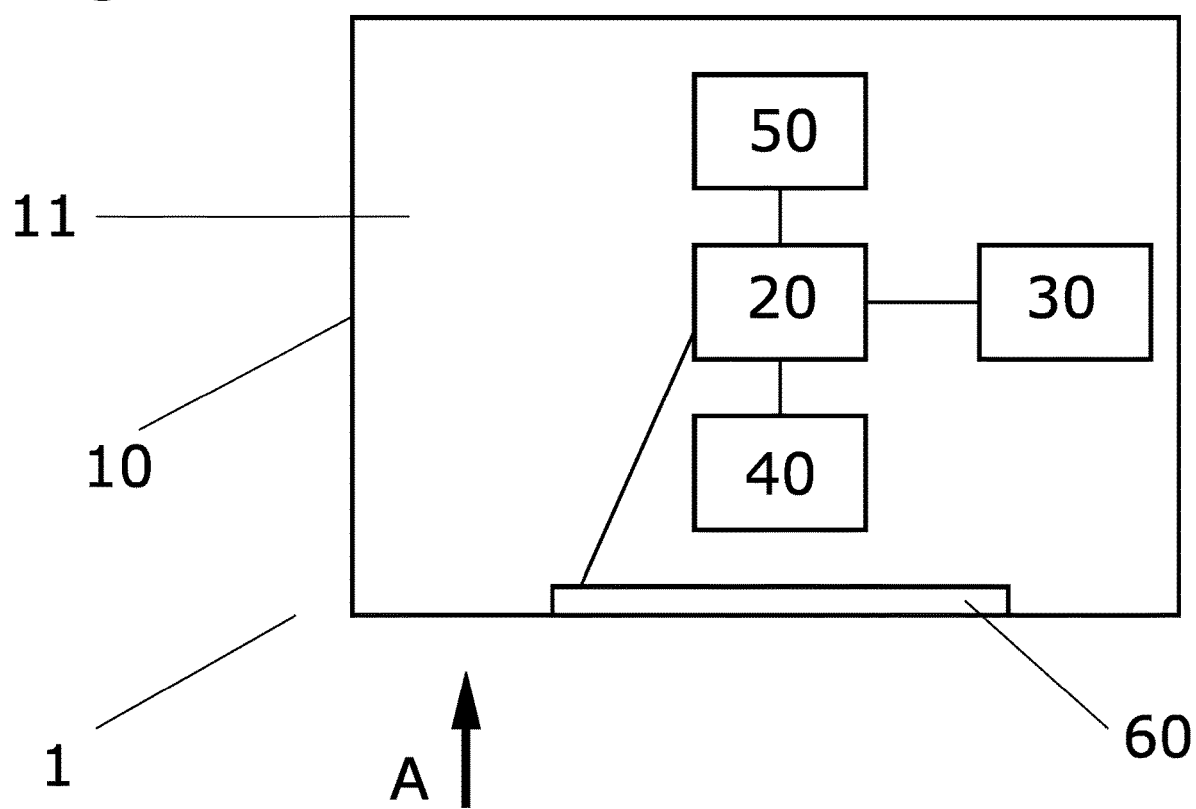
FIG. 1 shows a plan view of a housing opened from above.

FIG. 1 shows a plan view of a housing of a field device 1 of the invention. The housing is opened from above and has a housing wall 10 and a housing chamber 11, in which are arranged an operating electronics 20, a radio module 30, an acceleration sensor 40 and a measuring transducer 50, wherein a display unit 60 is inset into the housing wall 10. A side of the housing wall 10 shown in FIG. 2 is indicated in FIG. 1 by the letter A. The acceleration sensor 40 can, in such case, be mechanically coupled with the display unit 60. The measuring transducer can, for example, be adapted to register at least one measured variable from the following list: volume flow, mass flow, density, viscosity, temperature, pressure, fill level, pH-value, electrical conductivity, electrical current, electrical voltage, capacitance, inductance, transmission and/or absorption of electromagnetic radiation, transmission and/or absorption of sound signals.

By touching or tapping on the housing of the field device 1 with a first input signal sequence, the radio module 30, which is, for example, a Bluetooth radio module, can be turned on. By a second input signal sequence, the radio module 30 can be turned off. Radio module 30 provides access to the operating electronics 20 of the field device 1, which access enables the exchange of information between the operating electronics 20 and a user. The exchange of information can serve, in such case, for example, for retrieving measurement data or control or servicing of the field device 1 by a user.

A mechanical input signal sequence transmitted by touching or tapping, wherein an input signal sequence has a series of input signals, is converted by an acceleration sensor 40 into an electrical signal sequence. The detecting of an input signal sequence is done by the acceleration sensor 40 or by the operating circuit 20 electronically coupled with the acceleration sensor 40.

In an advantageous form of embodiment, in order to separate a signal from omnipresent noise, for example, an acceleration lower limit to be achieved by touching or tapping can be established.

Depending on availability of computing power in the field device, also a more advanced signal analysis can be used, wherein, for example, a frequency analysis based on Fourier transformation of an input signal of the input signal sequence or the total input signal sequence is performed. A frequency analysis can be helpful, in order to detect excited eigenfrequencies of the housing of the field device 1 and noise and to separate such from typical frequencies of input signals or input signal sequences.

In an advantageous form of embodiment, instead of a frequency analysis based on Fourier transformation, also the concept of "Discrete Wavelet Analysis" can be applied for signal analysis. In such case, a wavelet, whose shape is similar to that of a typical input signal as a function of time, is convoluted with the signal registered by the acceleration sensor 40. A maximum of the convolution arises from high agreement of the wavelet with the signal registered by the acceleration sensor 40. The contribution of noise or excited eigenfrequencies of the housing to the signal registered by the acceleration sensor 40 can, in such case, be effectively masked out, since the convolution of any function with a wavelet acts like a band pass filter. This procedure can in given cases be characterized by a lower need for computing power.

In the case, in which the acceleration sensor 40 takes acceleration values of two or three spatial axes separately into consideration, a spatial acceleration profile of the field device 1 can be supplementally created. By reconciliation with desired profiles, the detecting of input signals and input signal sequences can be improved. Desired profiles and/or the shape of the at least one wavelet can, in such case, be stored in the operating electronics 20.

The detecting of an input signal sequence is based on analysis of time intervals and/or amplitudes and/or number of input signals of the input signal sequence. Preferably, an input signal sequence has, in such case, at least two input signals, wherein the time separation between neighboring input signals is, at most, 5 seconds and especially, at most, 3 seconds. In this way, a distinguishing of stochastic, individual shocks is assured. For example, an input signal sequence can also comprise a plurality of sequence subregions. The first input signal sequence and the second input signal sequence can, for example, be equal. In this way, the memory requirement of the operating electronics of the field device is less.

FIG. 2 shows a side view of the side of the housing of the field device 1 indicated in FIG. 1 with the arrow A, with the housing wall 10 and the display unit 60 inset into the housing wall 10 and coupled electronically with the operating electronics. The display unit 60 is adapted in a first mode to display a first set of parameters. The first set of parameters can comprise, for example, at least one current, measured variable or an energy consumption or a data transmission rate. A third input signal sequence can be used to cause the display unit 60 to output a second set of parameters. The second set of parameters can comprise, for example, at least one current, measured variable converted into another unit or at least one measured variable as a function of time over a specified time interval or the average value of at least one measured variable over a specified time interval. The second set of parameters can also comprise a list of a plurality of device parameters. The changing of the display unit from the second mode into the first mode can, in such case, occur automatically following a certain amount of time or by a fourth input signal sequence, wherein the fourth input signal sequence can be equal to the third input signal sequence. In an additional form of embodiment, the display unit can also be operated in at least a third mode, wherein the third mode is adapted to allow the display unit to display a third parameter set.

The field device of the invention includes thus at least one acceleration sensor, with which a radio module 30 can be turned on- and off by mechanical interaction.

The invention claimed is:

1. A field device of measuring and automation technology, comprising:

a housing with a housing body defining a housing chamber with a housing wall, wherein the housing wall surrounds the housing chamber;

a measuring transducer configured to register a measured variable;

an operating electronics configured to operate the measuring transducer and provide a signal dependent on the measured variable, wherein the operating electronics is disposed in the housing chamber, and wherein the operating electronics is electronically coupled with the measuring transducer;

a radio module configured to transmit information, wherein the radio module is electronically coupled with the operating electronics, wherein the radio module is disposed in the housing chamber; and an acceleration sensor disposed in the housing chamber, wherein the acceleration sensor registers an acceleration of the housing body, and wherein the operating electronics is electronically coupled with the acceleration sensor and is further configured to interpret a sequence of accelerations generated by mechanical interaction between a user and the housing as an input signal sequence used for control of the operating electronics;

wherein the radio module is activated by a first input signal sequence and is deactivated by a second input signal sequence;

wherein the operating electronics is configured to analyze an acceleration value measured by the acceleration signal and to register an exceedance of an acceleration limit value as an input signal; and wherein the acceleration sensor or the operating electronics is configured to utilize oscillation frequencies ascertained for analysis of the acceleration values.

2. The field device of claim 1, wherein the radio module is a Bluetooth radio module.

3. The field device of claim 1, further comprising:
a display unit;

wherein the display unit is inset in the housing wall, is electronically coupled with the operating electronics, and displays a first set of parameters in a first mode;

wherein the display unit is triggered by the operating electronics or a third input signal sequence to display at least a second set of parameters.

4. The field device of claim 3, wherein the display unit includes a display or an LED element.

5. The field device of claim 4, wherein the exceedance of the acceleration limit value is registrable by the acceleration sensor as the input signal, and wherein the input signal or a registered input signal sequence registered by the acceleration sensor is registrable by the operating electronics.

6. The field device of claim 5, wherein the acceleration sensor or the operating electronics is configured to utilize acceleration values relative to one, two, or three spatial axes for registering the input signal or the registered input signal sequence.

7. The field device of claim 5, wherein detecting the registered input signal sequence is based on analysis of time intervals, amplitudes, or a number of input signals of the registered input signal sequence.

8. The field device of claim 1, wherein the first input signal sequence and the second input signal sequence are equal.

9. The field device of claim 1, wherein two input signal sequences are separated by a time interval of at least 3 seconds.

10. The field device of claim 1, wherein the measuring transducer is disposed in the housing chamber.

11. The field device of claim 1, wherein the measured variable is one of a volume flow, mass flow, density, viscosity, temperature, pressure, fill level, pH-value, electrical conductivity, electrical current, electrical voltage, capacitance, inductance, transmission of electromagnetic radiation, absorption of electromagnetic radiation, transmission of sound signals, and transmission of sound signals.

* * * * *